United States Patent
Luo et al.

(10) Patent No.: US 11,283,208 B2
(45) Date of Patent: Mar. 22, 2022

(54) 3D PRINTED HIGH RESOLUTION ELECTRICAL CONNECTORS WITH NOVEL MATERIAL REMOVAL FEATURES

(71) Applicant: TE CONNECTIVITY SERVICES GMBH, Schaffhausen (CH)

(72) Inventors: Xiaoming Luo, Hummelstown, PA (US); Hailing Liu, Union City, CA (US); Thierry Emile Marin-Martinod, Hershey, PA (US); Andrew M. Martin, Glendale, CA (US); Matt Mcalonis, Elizabethtown, PA (US); Mark Stephen Ostasiuk, Newark, CA (US); Kevin Michael Thackston, York, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/792,534

(22) Filed: Feb. 17, 2020

(65) Prior Publication Data
US 2021/0257767 A1     Aug. 19, 2021

(51) Int. Cl.
*H01R 13/42* (2006.01)
*B33Y 10/00* (2015.01)
(Continued)

(52) U.S. Cl.
CPC .............. *H01R 13/42* (2013.01); *B33Y 10/00* (2014.12); *B33Y 80/00* (2014.12); *H01R 12/70* (2013.01);
(Continued)

(58) Field of Classification Search
CPC ...... H01R 13/42; H01R 13/422; H01R 13/62; H01R 13/2407; H01R 12/70; H01R 43/18; H01R 43/20; B33Y 10/00; B33Y 80/00
See application file for complete search history.

(56) References Cited

U.S. PATENT DOCUMENTS 2,984,811 A   5/1961   Hennessey, Jr. et al.
3,901,574 A   8/1975   Paullus et al.
(Continued)

FOREIGN PATENT DOCUMENTS

WO   2013/135848 A1   9/2013

OTHER PUBLICATIONS

Vermeir, et al, "Removing Raw Material When Designing for Additive Manufacturing", https://sirris.be.removing-raw-material-when-designing-additive-manufacturing, Sep. 3, 2019, pp. 1-10.
(Continued)

*Primary Examiner* — Briggitte R. Hammond (57) ABSTRACT

A single piece electrical connector having a housing with a mating face, a wire receiving face, and housing side walls. Terminal receiving cavities extend from the mating face to the wire receiving face. The terminal receiving cavities have cavity side walls. Resilient securing arms are provided in the terminal receiving cavities. The resilient securing arms have fixed portions which extend from and are integrally attached to base members which extend from and are integrally attached to the cavity side walls of the terminal receiving cavities. The resilient securing arms are made from the same material and in the same manufacturing process that forms the housing. The fixed ends are spaced from the cavity side walls by gaps. The gaps between the resilient securing arms and the cavity side walls facilitate the cleaning or removal of excess material formed during the manufacturing process of the electrical connector.

16 Claims, 6 Drawing Sheets

(51) Int. Cl.
*B33Y 80/00* (2015.01)
*H01R 12/70* (2011.01)
*H01R 13/24* (2006.01)
*H01R 13/502* (2006.01)
*H01R 13/62* (2006.01)

(52) U.S. Cl.
CPC ....... *H01R 13/2407* (2013.01); *H01R 13/502* (2013.01); *H01R 13/62* (2013.01)

(56) References Cited

U.S. PATENT DOCUMENTS

| | | |
|---|---|---|
| 4,168,105 A | 9/1979 | Hermann, Jr. |
| 4,664,460 A | 5/1987 | Vandame |
| 6,203,349 B1 | 3/2001 | Nakazawa |
| 9,793,639 B1 | 10/2017 | Morello et al. |
| 10,396,485 B1 | 8/2019 | Smoll et al. |
| 10,651,593 B2 | 5/2020 | Wu et al. |
| 2013/0203280 A1 | 8/2013 | Greub et al. |

OTHER PUBLICATIONS

European Search Report, dated Jun. 21, 2021, EP 21 15 7200, European Application No. 21157200.3-1201.
European Search Report, dated Jul. 1, 2021, EP 21 15 7169, European Application No. 21157169.0-1201.

3D PRINTED HIGH RESOLUTION ELECTRICAL CONNECTORS WITH NOVEL MATERIAL REMOVAL FEATURES

FIELD OF THE INVENTION

The present invention is directed a one piece 3D printed electrical connector with securing arms which facilitates the removal of material, such as resin or powder, from the connector. In particular, the invention is directed to a one piece printed electrical connector which has passageways which allow the resin to be rinsed from the printed connector.

BACKGROUND OF THE INVENTION

Electrical connector components are typically manufactured from traditional methods and are designed to accommodate the respective traditional tooling methods. Connectors manufactured from multiple components also require assembly and may have lengthy and complex bills of materials and component lead times. A connector designed with the 3D printing or additive manufacturing process in mind can be constructed with consolidated components and/or eliminate many components and manufacturing steps, however all connectors need to be designed for manufacturability. Such 3D printable connectors must be configured to allow the photo curable resin to be completely rinsed from the resulting product in order to obtain optimal performance. However, known connectors have product features which do not allow for adequate residual material removal and cleaning and, ultimately, result in the product not performing as intended.

It would, therefore be beneficial to provide an electrical connector which is configured to prevent material entrapment and allow adequate material, such as resin or powder, drainage and final rinsing/cleaning resulting in superior product performance. In particular, it would be beneficial to position components and provide weep holes to facilitate improved material removal and cleaning during an additive manufacturing process.

SUMMARY OF THE INVENTION

An embodiment is directed to a single piece electrical connector having a housing with a mating face, a wire receiving face, and housing side walls. Terminal receiving cavities extend from the mating face to the wire receiving face. The terminal receiving cavities have cavity side walls. Resilient securing arms are provided in the terminal receiving cavities. The resilient securing arms have fixed portions which extend from and are integrally attached to base members or projection members which extend from and are integrally attached to the cavity side walls of the terminal receiving cavities. The resilient securing arms are made from the same material and in the same manufacturing process that forms the housing. The fixed ends are spaced from the cavity side walls by gaps. The gaps between the resilient securing arms and the cavity side walls facilitate the cleaning or removal of excess material formed during the manufacturing process of the electrical connector.

An embodiment is directed to an electrical connector made from an additive manufacturing process. The electrical connector includes a housing having a mating face, a wire receiving face, and housing side walls. Terminal receiving cavities extend from the mating face to the wire receiving face. The terminal receiving cavities have cavity side walls. Resilient securing arms are provided in the terminal receiving cavities. The resilient securing arms have fixed portions which extend from and are integrally attached to base members or projection members which extend from and are integrally attached to the cavity side walls of the terminal receiving cavities. The resilient securing arms are made from the same material and in the same process that forms the housing. The fixed ends are spaced from the cavity side walls by gaps. Cleaning openings are provided on the mating face of the connector housing. The cleaning openings extend through the mating face and into the terminal receiving cavities. Mating terminal receiving openings extend through the mating face of the connector housing. The mating terminal receiving openings extend into the terminal receiving cavities. The cleaning openings are positioned proximate to the mating terminal receiving openings. The gaps between the resilient securing arms and the cavity side walls and the cleaning openings facilitate the removal of excess material formed during the manufacturing process of the electrical connector.

An embodiment is directed to a method of manufacturing an electrical connector with integral resilient securing arms. The method includes: printing a body of the electrical connector in an additive printing process, the body having terminal receiving cavities therein; printing the resilient securing arms simultaneously with the printing of the body, the resilient securing arms being positioned in the terminal receiving cavities; spacing the resilient securing arms from walls of the terminal receiving cavities to form gaps between the walls; and cleaning excess material created during the additive printing process from the terminal receiving cavities. The spacing of the resilient securing arms from the walls of the terminal receiving cavities allows the excess material to be removed from the terminal receiving cavities and the body of the electrical connector.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

With reference to FIGS. 1 through 5, an illustrative arrangement of terminal receiving cavities 20 in an illustrative single piece electrical connector housing 10 is shown. While the terminal receiving cavities 20 are shown in the illustrative connector housing 10, the invention, as described herein, can be used with terminal receiving cavities 20 in any type of connector housing or assembly. The connector housing 10 has a mating face 12, a wire receiving face 14, and housing side walls 16. In the embodiment shown, the side walls 16 extend beyond the mating face 12 and the wire receiving face 14, however, other configurations of the side walls 16 can be used without departing from the scope of the invention. In the illustrative embodiment shown, the connector housing 10 has a generally square or rectangular configuration, however, other types, sizes and shapes or housings may be used. The electrical connector housing 10 is manufactured using an additive manufacturing process, such as, but not limited to 3D printing, to form a one piece connector housing.

Figure 3:
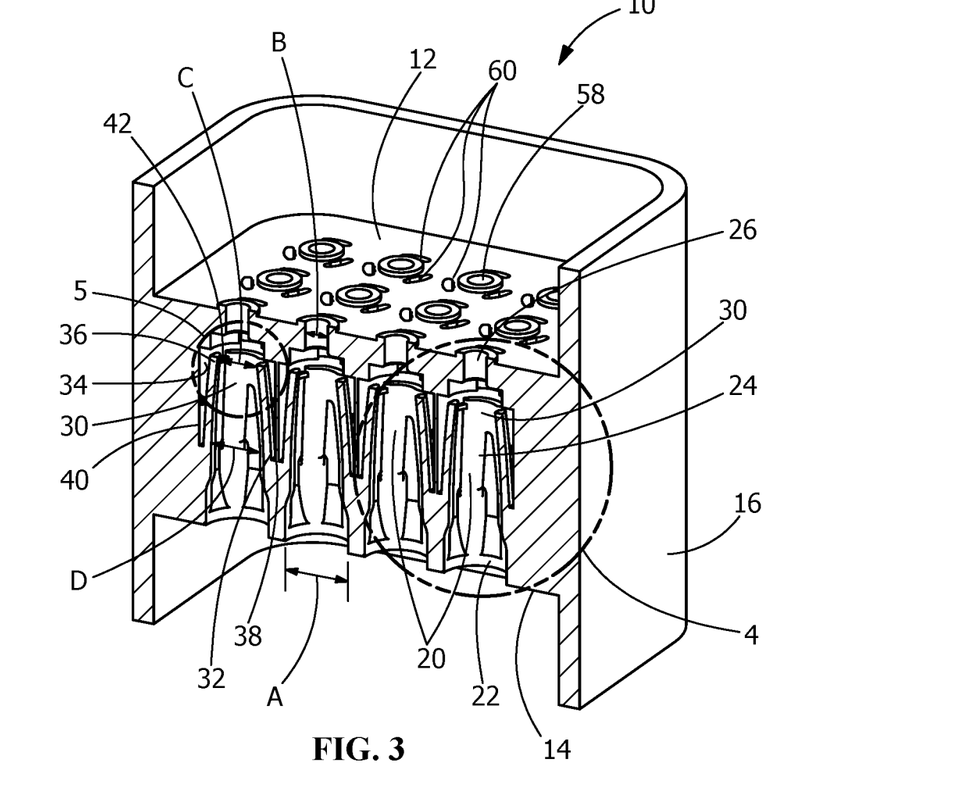
FIG. 3 is a cross-sectional view of the electrical connector of FIG. 1 taken along line 3-3 of FIG. 1.

As best shown in FIG. 3, the connector housing 10 has terminal receiving cavities 20 which extend from the mating face 12 to the wire receiving face 14. The terminal receiving cavities are dimensioned to receive terminals (not shown) therein. The particular configuration of the terminals may vary depending upon the application and amount of current required to flow across the terminal.

Figure 4:
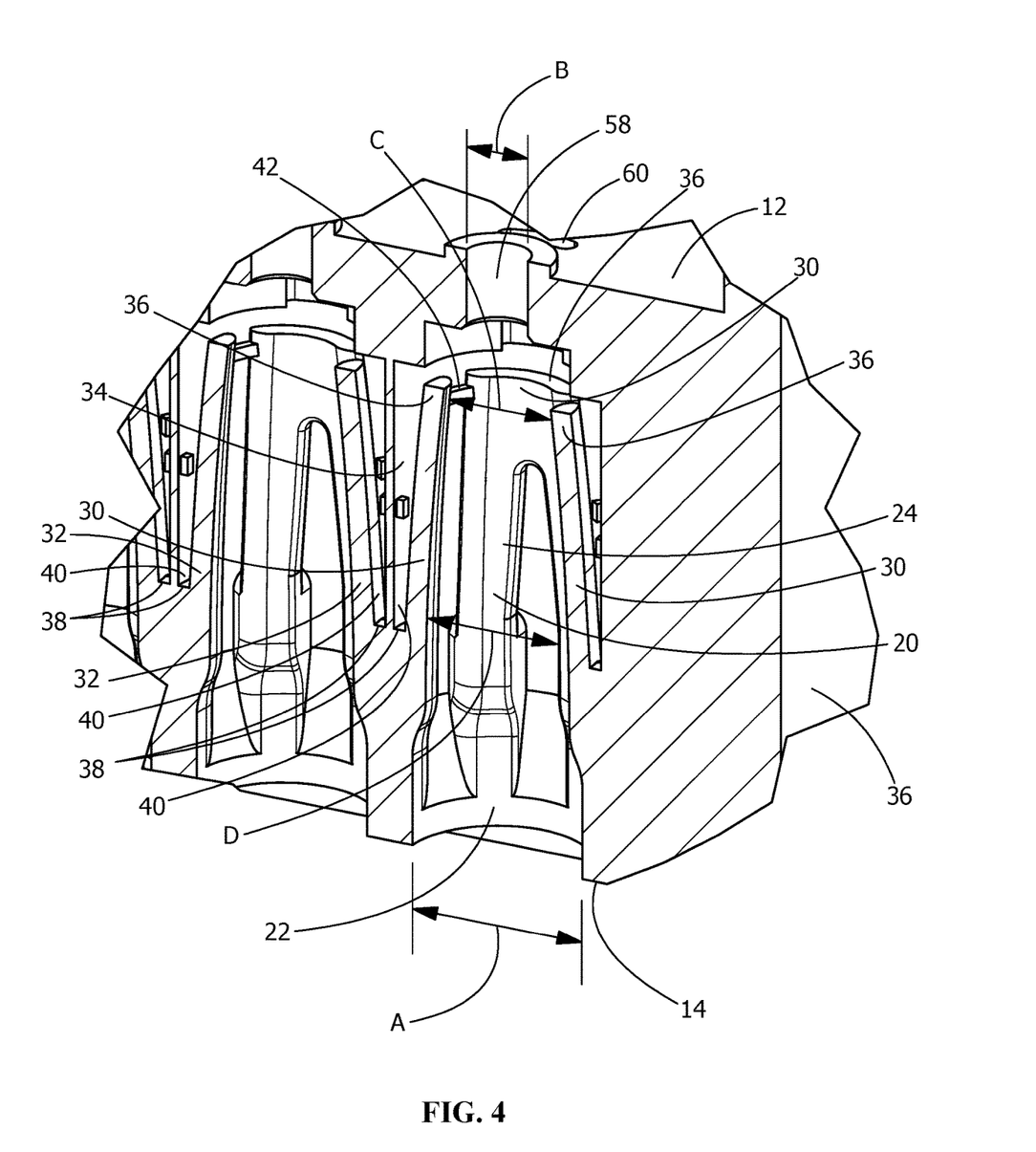
FIG. 4 is an enlarged cross-sectional view the area 4 of FIG. 3, showing a pair terminal receiving cavities of the electrical connector.

Each terminal receiving cavity 20, as best shown in FIGS. 3 and 4, has a wire receiving portion 22, a securing portion 24 and a mating terminal receiving portion 26. The wire receiving portion 22 is positioned proximate to the wire receiving face 14 of the housing 10. The mating terminal receiving portion 26 is position proximate to the mating face 12 of the housing. The securing portion 24 extends between the wire receiving portion 22 and the mating terminal receiving portion 26.

The wire receiving portion 22 has a diameter A which is large enough to receive the terminal therethrough. The mating terminal receiving portion 26 has a diameter B which is smaller than the diameter A of the wire receiving portion 22. The diameter B is dimensioned to be large enough to allow a mating contact or pin to be inserted therethrough. However, the diameter B is sufficiently small to prevent the terminal inserted through the wire receiving portion 22 to be removed through the mating terminal portion 26.

The securing portion 24 has resilient securing arms 30 provided therein. In the illustrative embodiment shown in FIGS. 1 through 5, three resilient securing arms 30 are provided in each terminal receiving cavity 20. However, other numbers of resilient securing may be provided. The securing arms 30 have a fixed portion 32 which extends from and is integrally attached to base member or projection member 38 which extends from and is integrally attached to a cavity side wall 34 of the terminal receiving cavity 20. As the securing arms 30 and the housing 10 are made in a single piece, the securing arms 30 are made from the same material and are made in the same process that forms the other parts of the housing 10. The fixed portion 32 is positioned proximate to or offset from the wire receiving face 14 of the housing 10. In the illustrative embodiment shown in FIGS. 1 through 5, the length of the securing arms 30 is equal to or proximate the length of the securing portion 24.

The resilient securing arms 30 extend from the fixed ends 32 toward the mating face 12 of the housing 10. The resilient securing arms 30 terminate at free ends 36 which are spaced from the side wall 34 of the terminal receiving cavity 20. The resilient securing arms 30 are configured to cooperate with the terminal inserted therein to maintain the terminal in the terminal receiving cavity 20. The free ends 36 of the resilient securing arms 30 tilt into the terminal receiving cavity further than the fixed ends 32, such that the diameter D of passage formed by the fixed ends 32 is greater than the diameter C of passage formed by the free ends 36.

The number, size, shape and positioning of the resilient securing arms 30 may vary. The length of the resilient securing arms 30 as measured from the fixed ends 32 to the free ends 36 may vary, as may the length of the terminal receiving cavity 20. The thickness of the resilient securing arms 30 may vary from one embodiment to another. In addition, the thickness of the resilient securing arms 30 may vary from the fixed ends 32 to the free ends 36. The amount of tilt of the free ends 36 may also be varied. While the resilient securing arms 30 in the embodiment shown have a longitudinal axis which is relatively straight, the resilient securing arms 30 may have a curved or helical configuration. The resilient securing arms 30 may be curved inward or outward depending upon the resiliency needed to maintain the terminal in position in the terminal receiving cavity 20.

Although the fixed ends 32 are fixed to base members or projection members 38 which extend from side wall 34 of the terminal receiving cavity 20, the fixed ends 32 are spaced from the side wall 34 by a gap 40. The size of the gap can be varied. As the resilient securing arms 30 are formed in the same process as the housing 10, and as tooling cannot be inserted into the terminal receiving cavity 20 to properly form the resilient securing arms 30, the housing 10 and resilient securing arms 30 must be formed by an additive manufacturing process, such as, but not limited to 3D printing. Consequently, it is imperative that excess material or unwanted material be able to be cleaned out or removed from the terminal receiving cavity 20 upon completion of the formation of the housing 20 and the resilient securing arms 30. Providing gaps 40 between the resilient securing arms 30 and the side wall 34 facilitates the cleaning or removal of the excess material.

Figure 5:
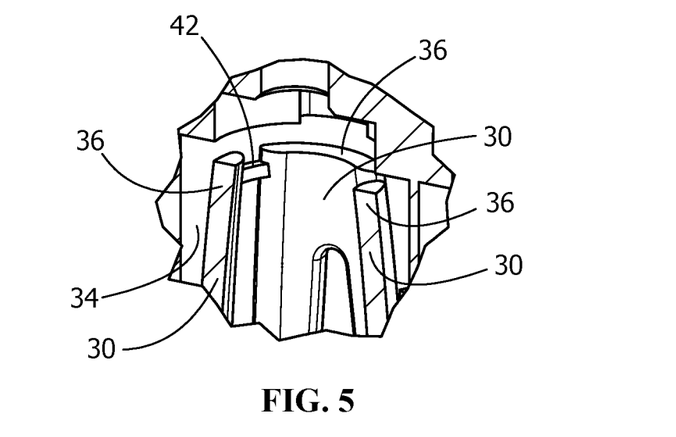
FIG. 5 is an enlarged view of the area 5 represented by the broken circle of FIG. 3.

In order to properly maintain the position of the free ends 36 prior to the insertion of the terminal in the terminal receiving cavity 20, holders or tabs 42 extend between the free ends 36 of adjacent resilient securing arms 30, as best shown in FIG. 5. The holders or tabs 42 are integrally formed with the free ends 36 to maintain the free ends 36 in position relative to each other as the connector housing 10 and the resilient securing arms 30 are cleaned and cured. The holders or tabs 42 are configured to break as the mating terminal is inserted into the terminal receiving cavity 20 to allow the resilient securing arms 30 to act independently to secure the terminal in position.

Figure 1:
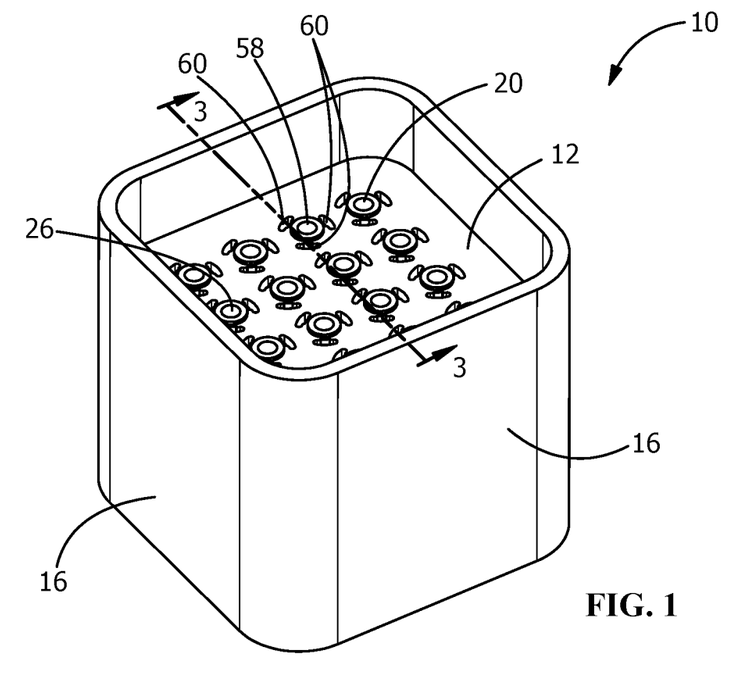
FIG. 1 is a top perspective of an illustrative embodiment of an electrical connector of the present invention.
Figure 2:
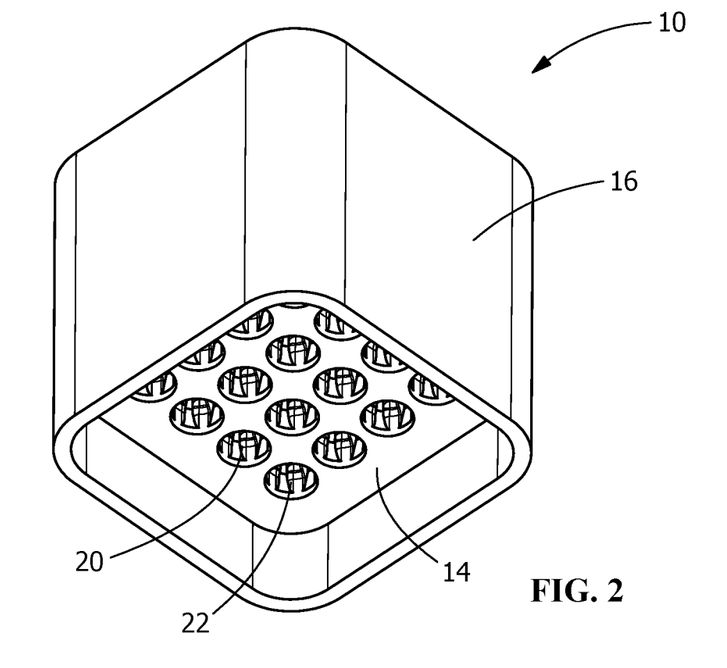
FIG. 2 is a bottom perspective view of the electrical connector of FIG. 1.

Referring to FIGS. 1, 3 and 4, mating terminal receiving openings 58 extend through the mating face 12 of the connector housing 10. Cleaning openings 60 are provided on the mating face 12 of the connector housing 10. The cleaning openings 60 are positioned proximate to the mating terminal receiving openings 58 and extend through the mating face 12 and into the mating terminal receiving portions 26 of the terminal receiving cavities 20. In the illustrative embodiment shown, the cleaning openings 60 are smaller in size than the mating terminal receiving openings 58, whereby the mating terminals cannot be inserted into the cleaning openings 60. However, other embodiments the cleaning openings 60 may be integrally connected to the mating terminal receiving openings 58.

In this illustrative embodiment, three cleaning openings 60 extend into each terminal receiving cavity 20, with the cleaning openings 60 positioned in approximate alignment with the securing arms 30 of the respective terminal receiving cavity 20. However, other numbers and positioning of the cleaning openings 60 may be used. The cleaning openings 60 facilitates the removal of the excess material or unwanted material from the terminal receiving cavity 20 upon completion of the formation of the housing 20 and the resilient securing arms 30.

With reference to FIGS. 6 through 10, an alternate illustrative electrical connector housing 110 is shown. The connector housing 110 has a mating face 112, a wire receiving face 114, and side walls 116. In the embodiment shown, the side walls 116 extend between the mating face 112 and between the wire receiving face 114, however, other configurations of the side walls 116 can be used without departing from the scope of the invention. In the illustrative embodiment shown, the connector housing 110 has a generally square or rectangular configuration, however, other configurations, such as, but not limited to circular, may be used.

Figures 8, 10:
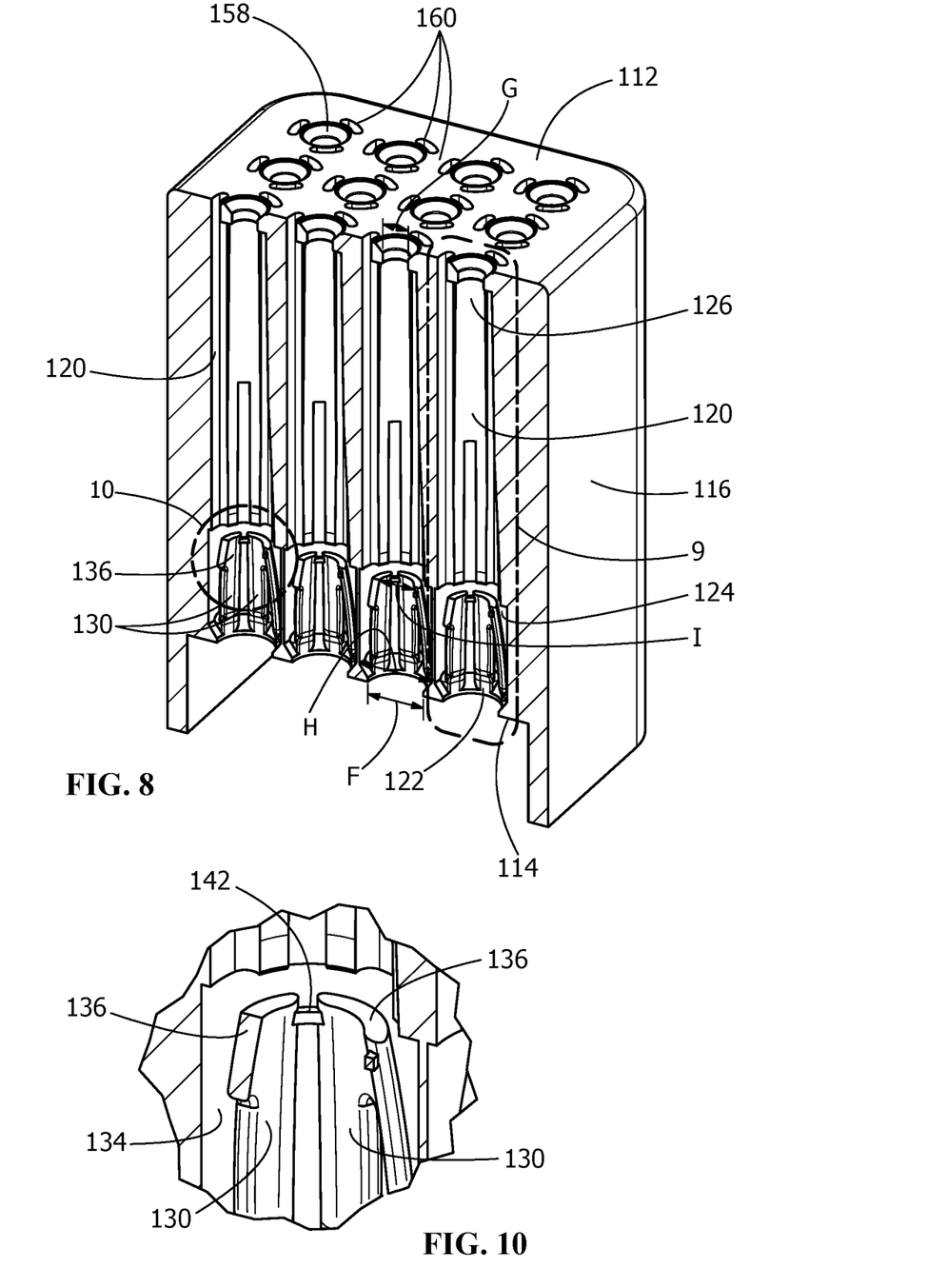
FIG. 8 is a cross-sectional view of the electrical connector of FIG. 6 taken along line 8-8 of FIG. 6.
FIG. 10 is an enlarged view of the area 10 represented by the broken circle of FIG. 8.

As best shown in FIG. 8, the connector housing 110 has terminal receiving cavities 120 which extend from the mating face 112 to the wire receiving face 114. The terminal receiving cavities are dimensioned to receive terminals (not shown) therein. The particular configuration of the terminals may vary depending upon the application and amount of current required to flow across the terminal.

Figure 9:
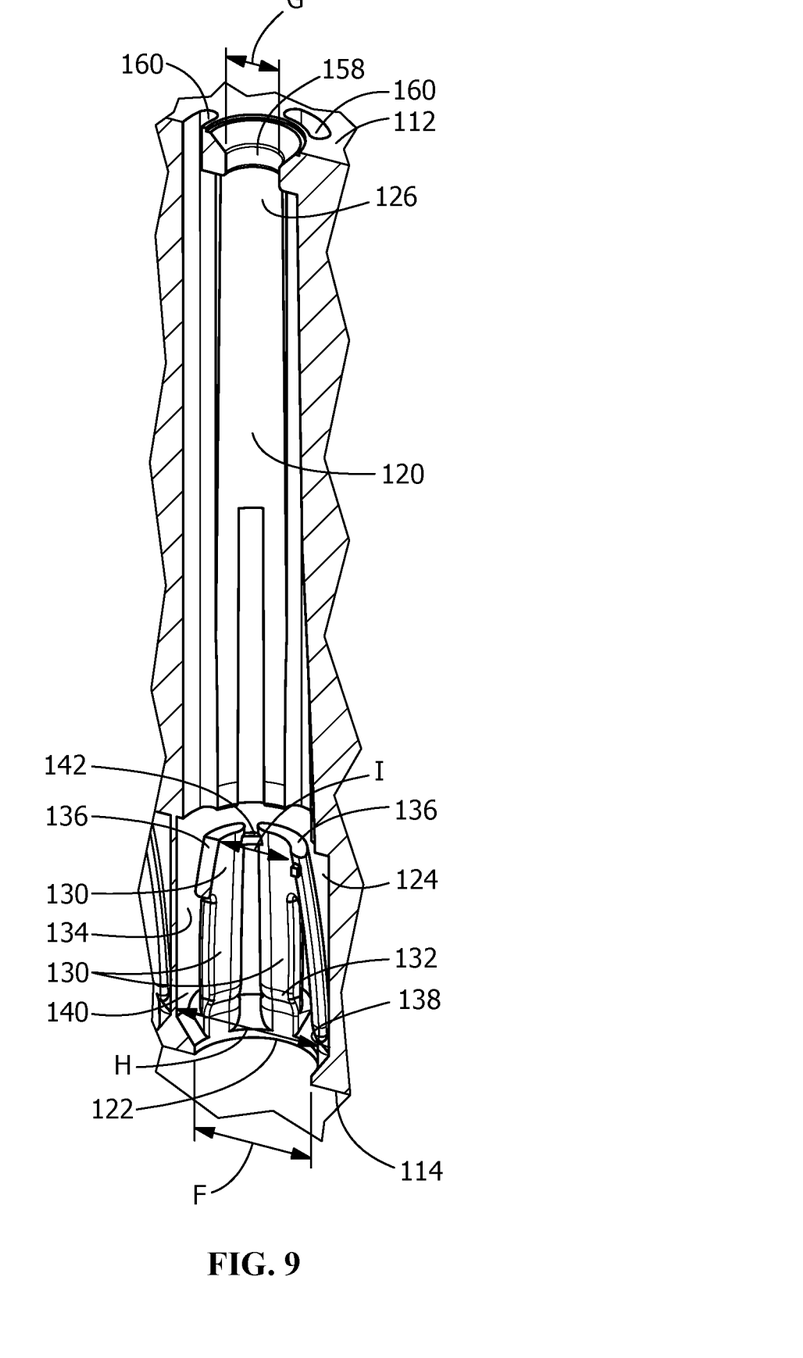
FIG. 9 is an enlarged cross-sectional view the area 9 of FIG. 8, showing a terminal receiving cavity of the electrical connector.

As best shown in FIGS. 8 and 9, each terminal receiving cavity 120 has a wire receiving portion 122, a securing portion 124 and a mating terminal receiving portion 126. The wire receiving portion 122 is positioned proximate to the wire receiving face 114 of the housing 110. The mating terminal receiving portion 126 is position proximate to the mating face 112 of the housing. The securing portion 124 extends between the wire receiving portion 122 and the mating terminal receiving portion 126.

The wire receiving portion 122 has a diameter F which is large enough to receive the terminal therethrough. The mating terminal receiving portion 126 has a diameter G which is smaller than the diameter F of the wire receiving portion 122. The diameter G is dimensioned to be large enough to allow a mating contact or pin to be inserted therethrough. However, the diameter G is sufficiently small to prevent the terminal inserted through the mating terminal receiving portion 126 to be removed through the wire receiving portion 122.

The securing portion 124 has resilient securing arms 130 provided therein. In the illustrative embodiment shown in FIGS. 6 through 10, three resilient securing arms 130 are provided in each terminal receiving cavity 20. However, other numbers of resilient securing may be provided. The securing arms 130 have a fixed portion 132 which extends from and is integrally attached to base member or projection member 138 which extends from and is integrally attached to a side wall 134 of the terminal receiving cavity 120. The securing arms 130 are made from the same material and are made in the same process that forms the other parts of the housing 110. The fixed portion 132 is positioned proximate to or offset from the wire receiving face 114 of the housing 110. In the illustrative embodiment shown in FIGS. 6 through 9, the length of the securing portion 124 is greater than the length of the securing arms 130.

The resilient securing arms 130 extend from the fixed ends 132 toward the mating face 112 of the housing 110. The resilient securing arms 130 terminate at free ends 136 which are spaced from the side wall 134 of the terminal receiving cavity 120. The resilient securing arms 130 are configured to cooperate with the terminal inserted therein to maintain the terminal in the terminal receiving cavity 120. The free ends 136 of the resilient securing arms 130 tilt into the terminal receiving cavity further than the fixed ends 132, such that the diameter H of passage formed by the fixed ends 132 is greater than the diameter I of passage formed by the free ends 136.

The number, size, shape and positioning of the resilient securing arms 130 may vary. The length of the resilient securing arms 130 as measured from the fixed ends 132 to the free ends 136 may vary, as may the length of the terminal receiving cavity 120. The thickness of the resilient securing arms 130 may vary from one embodiment to another. In addition, the thickness of the resilient securing arms 130 may vary from the fixed ends 132 to the free ends 136. The amount of tilt of the free ends 136 may also be varied. While the free ends 136 of the resilient securing arms 130 in the embodiment shown are curved slightly inward relatively straight, the resilient securing arms 130 may have a helical configuration. The resilient securing arms 130 may be curved outward or be straight depending upon the resiliency needed to maintain the terminal in position in the terminal receiving cavity 120.

Although the fixed ends 132 are fixed to base members or projection members 138 which extend from side wall 134 of the terminal receiving cavity 120, the fixed ends 132 are spaced from the side wall 134 by a gap 140. The size of the gap can be varied. As the resilient securing arms 130 are formed in the same process as the housing 110, and as tooling cannot be inserted into the terminal receiving cavity 120 to properly form the resilient securing arms 130, the housing 110 and resilient securing arms 130 must be formed by an additive manufacturing process, such as, but not limited to 3D printing. Consequently, it is imperative that excess material or unwanted material be able to be cleaned out or removed from the terminal receiving cavity 120 upon completion of the formation of the housing 120 and the resilient securing arms 130. Providing gaps 140 between the resilient securing arms 130 and the side wall 134 facilitates the cleaning or removal of the excess material.

In order to properly maintain the position of the free ends 136 prior to the insertion of the terminal in the terminal receiving cavity 120, holders or tabs 142 extend between the free ends 136 of adjacent resilient securing arms 130, as best shown in FIG. 10. The holders or tabs 142 are integrally formed with the free ends 136 to maintain the free ends 136 in position relative to each other as the connector housing 110 and the resilient securing arms 130 are cleaned and thermally cured. The holders or tabs 142 are configured to break as the mating terminal is inserted into the terminal receiving cavity 120 to allow the resilient securing arms 130 to act independently to secure the terminal in position.

Figure 6:
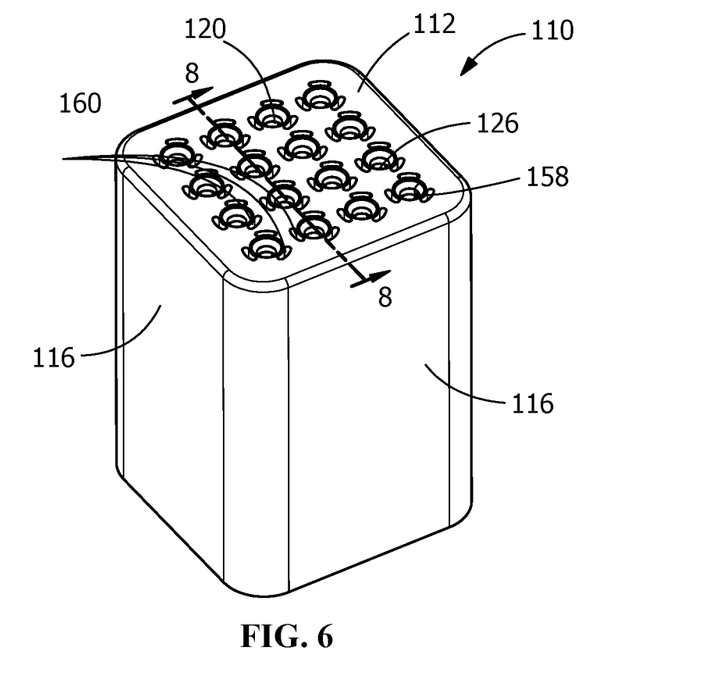
FIG. 6 is a top perspective of an alternate illustrative embodiment of an electrical connector of the present invention.
Figure 7:
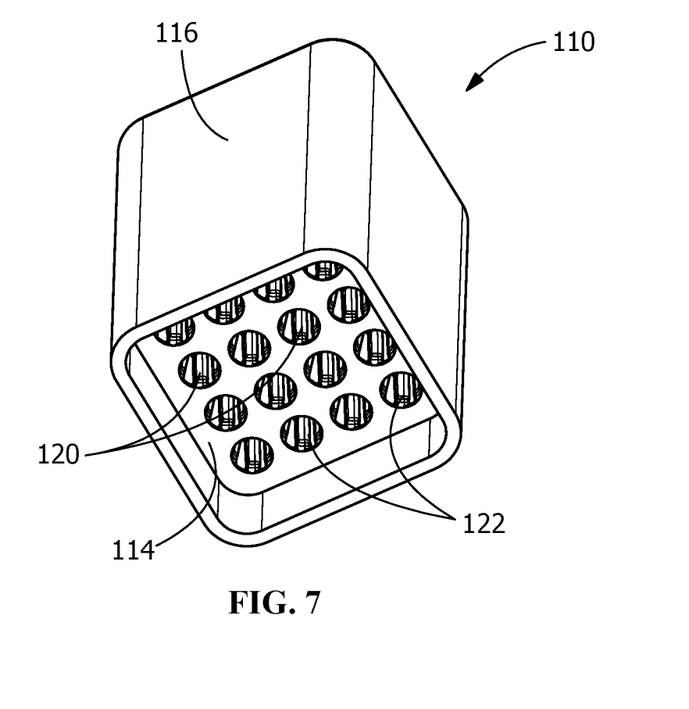
FIG. 7 is a bottom perspective view of the electrical connector of FIG. 6.

Referring to FIGS. 6, 8 and 9, mating terminal receiving openings 158 extend through the mating face 112 of the connector housing 110. The mating terminal receiving openings 158 extend into the mating terminal receiving portions 126 of the terminal receiving cavities 120 and are dimensioned to receive the mating terminals of the mating connector therein. Cleaning openings 160 are provided on the mating face 112 of the connector housing 110. The cleaning openings 160 are positioned proximate to the mating terminal receiving openings 158 and extend through the mating face 112 and into the mating terminal receiving portions 126 of the terminal receiving cavities 120.

The cleaning openings 160 are smaller in size than the mating terminal receiving openings 158, whereby the mating terminals cannot be inserted into the cleaning openings 160. In this illustrative embodiment, three cleaning openings 160 extend into each terminal receiving cavity 120, with the cleaning openings 160 positioned in approximate alignment with the securing arms 130 of the respective terminal receiving cavity 120. However, other numbers and positioning of the cleaning openings 160 may be used. The cleaning openings 160 facilitates the removal of the excess material or unwanted material from the terminal receiving cavity 120 upon completion of the formation of the housing 120 and the resilient securing arms 130.

In various illustrative embodiments, the gap 40, 140 may be, but is not limited to, 0.15 mm, 0.20 mm, 0.30 mm, between 0.15 mm and 0.30 mm, greater than 0.30 mm. In various illustrative embodiments, the securing arms 30, 130 may have, but are not limited to, a thickness of 0.35 mm, 0.37 mm, between 0.30 mm and 0.40 mm. In various illustrative embodiments, the securing arms 30, 130 may have, but are not limited to, 4 spring arms with a range about the circumference of the terminal receiving cavity 20, 120 of 75 degrees and a gap between the spring arms of 15 degrees, 5 spring arms with a range about the circumference of the terminal receiving cavity 20, 120 of 65 degrees and a gap between the spring arms of 15 degrees, 6 spring arms with a range about the circumference of the terminal receiving cavity 20, 120 of 45 degrees and a gap between the spring arms of 15 degrees.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

We claim:

1. A single piece electrical connector comprising:
    a housing having a mating face, a wire receiving face, and housing side walls;
    terminal receiving cavities extending from the mating face to the wire receiving face, the terminal receiving cavities having cavity side walls;
    resilient securing arms provided in the terminal receiving cavities, the resilient securing arms having fixed ends which extend from and are integrally attached to base members which extend from and are integrally attached to the cavity side walls of the terminal receiving cavities, the resilient securing arms being made from the same material and in the same manufacturing process that forms the housing, the fixed ends being spaced from the cavity side walls by gaps;
    tabs extending between free ends of adjacent resilient securing arms, the tabs being integrally formed with the free ends to maintain the free ends in position relative to each other;
    wherein the gaps between the resilient securing arms and the cavity side walls facilitate the cleaning or removal of excess material formed during the manufacturing process of the electrical connector.

2. The electrical connector as recited in claim 1, wherein the housing side walls extend beyond the mating face and the wire receiving face.

3. The electrical connector as recited in claim 1, wherein the housing has a generally rectangular configuration.

4. The electrical connector as recited in claim 1, wherein the terminal receiving cavities have wire receiving portions, securing portions and mating terminal receiving portion, the wire receiving portion is positioned proximate to the wire receiving face of the housing, the mating terminal receiving portion is position proximate to the mating face of the housing, the securing portion extends between the wire receiving portion and the mating terminal receiving portion.

5. The electrical connector as recited in claim 4, wherein the resilient securing arms are positioned in the securing portion.

6. The electrical connector as recited in claim 1, wherein the fixed ends are positioned proximate to the wire receiving face of the housing.

7. The electrical connector as recited in claim 4, wherein lengths of the securing arms are equal to lengths of the securing portions.

8. The electrical connector as recited in claim 1, wherein the resilient securing arms extend from the fixed ends toward the mating face of the housing and terminate at the free ends which are spaced from the cavity side walls of the terminal receiving cavity.

9. The electrical connector as recited in claim 8, wherein the free ends of the resilient securing arms tilt into the terminal receiving cavity further than the fixed ends, such that a diameter of a passage formed by the fixed ends is greater than a diameter of a passage formed by the free ends.

10. The electrical connector as recited in claim 1, wherein cleaning openings are provided on the mating face of the connector housing the cleaning openings extend through the mating face and into the mating terminal receiving portions of the terminal receiving cavities.

11. The electrical connector as recited in claim 10, wherein mating terminal receiving openings extend through the mating face of the connector housing, the mating terminal receiving openings extend into the mating terminal receiving portions of the terminal receiving cavities, the cleaning openings are positioned proximate to the mating terminal receiving openings, the cleaning openings are smaller in size than the mating terminal receiving openings, wherein the mating terminals cannot be inserted into the cleaning openings.

12. The electrical connector as recited in claim 10, wherein three cleaning openings extend into each terminal receiving cavity, with the cleaning openings positioned in approximate alignment with the securing arms of the respective terminal receiving cavity.

13. An electrical connector made from an additive manufacturing process, the electrical connector comprising:
   a housing having a mating face, a wire receiving face, and housing side walls;
   terminal receiving cavities extending from the mating face to the wire receiving face, the terminal receiving cavities having cavity side walls, the terminal receiving cavities having wire receiving portions, securing portions and mating terminal receiving portions, the wire receiving portions positioned proximate to the wire receiving face of the housing, the mating terminal receiving portions position proximate to the mating face of the housing, the securing portioned extends between the wire receiving portions and the mating terminal receiving portions;
   resilient securing arms provided in the in the securing portion of the terminal receiving cavities, the resilient securing arms having fixed ends which extend from and are integrally attached to base members which extend from and are integrally attached to the cavity side walls of the terminal receiving cavities, the resilient securing arms being made from the same material and in the same process that forms the housing, the fixed ends being spaced from the cavity side walls by gaps;
   cleaning openings provided on the mating face of the connector housing, the cleaning openings extending through the mating face and into the terminal receiving cavities;
   mating terminal receiving openings extending through the mating face of the connector housing, the mating terminal receiving openings extending into the terminal receiving cavities, the cleaning openings being positioned proximate to the mating terminal receiving openings;
   wherein the gaps between the resilient securing arms and the cavity side walls and the cleaning openings facilitate the removal of excess material formed during the manufacturing process of the electrical connector.

14. The electrical connector as recited in claim 13, wherein lengths of the securing arms are equal to lengths of the securing portions.

15. The electrical connector as recited in claim 14, wherein the resilient securing arms have tabs which extend between the free ends of adjacent resilient securing arms, the tabs are integrally formed with the free ends to maintain the free ends in position relative to each other as the connector housing and the resilient securing arms are cleaned and thermally cured.

16. A single piece electrical connector comprising:
   a housing having a mating face, a wire receiving face, and housing side walls;
   terminal receiving cavities extending from the mating face to the wire receiving face, the terminal receiving cavities having cavity side walls;
   resilient securing arms provided in the terminal receiving cavities, the resilient securing arms having fixed ends which extend from and are integrally attached to base members which extend from and are integrally attached to the cavity side walls of the terminal receiving cavities, the resilient securing arms being made from the same material and in the same manufacturing process that forms the housing, the fixed ends being spaced from the cavity side walls by gaps;
   cleaning openings extending into each terminal receiving cavity, the cleaning openings positioned in approximate alignment with each of the resilient securing arms of the respective terminal receiving cavity;
   wherein the gaps between the resilient securing arms and the cavity side walls facilitate the cleaning or removal of excess material formed during the manufacturing process of the electrical connector.

* * * * *